United States Patent [19]

Yin et al.

[11] Patent Number: 5,702,805
[45] Date of Patent: Dec. 30, 1997

[54] PHOTOPOLYMER HOLOGRAPHIC DECAL FOR PLASTIC SUBSTRATE

[75] Inventors: Khin Swe Yin, Alhambra; Kevin Yu, Temple City; John E. Gunther, Torrance, all of Calif.

[73] Assignee: Hughes Electronics, Los Angeles, Calif.

[21] Appl. No.: 704,169

[22] Filed: Aug. 28, 1996

[51] Int. Cl.[6] .......................................... B32B 3/00
[52] U.S. Cl. .................. 428/195; 428/40.1; 428/343; 428/423.1; 428/915; 430/1; 430/2; 156/235; 156/239; 156/240; 156/247; 283/86
[58] Field of Search .................... 428/40.1, 195, 428/343, 423.1, 915; 430/1, 2; 156/235, 239, 240, 247; 283/86

[56] References Cited

U.S. PATENT DOCUMENTS

| | | | |
|---|---|---|---|
| 5,318,816 | 6/1994 | Yin et al. | 428/40 |
| 5,331,444 | 7/1994 | Biles | 359/3 |
| 5,401,346 | 3/1995 | Yin et al. | 156/233 |

*Primary Examiner*—William Krynski
*Attorney, Agent, or Firm*—Leonard A. Alkov; Wanda K. Denson-Low

[57] ABSTRACT

A hologram decal structure including a photopolymer hologram layer having hologram fringes recorded therein, a transparent pressure sensitive adhesive layer disposed on a first surface of the photopolymer hologram layer, and a transparent urethane coating disposed on a second surface of the photopolymer hologram layer, and techniques for making the hologram decal.

4 Claims, 1 Drawing Sheet

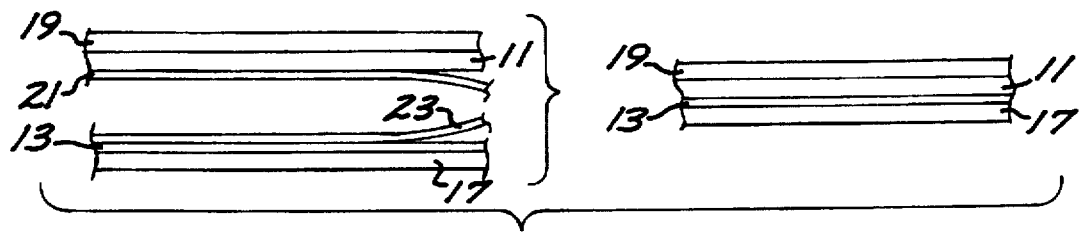
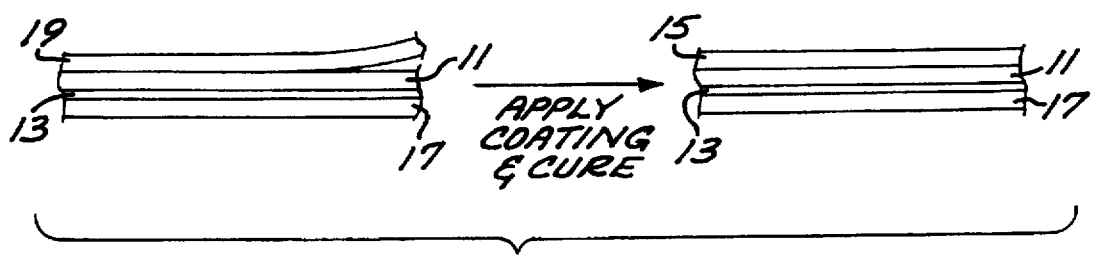
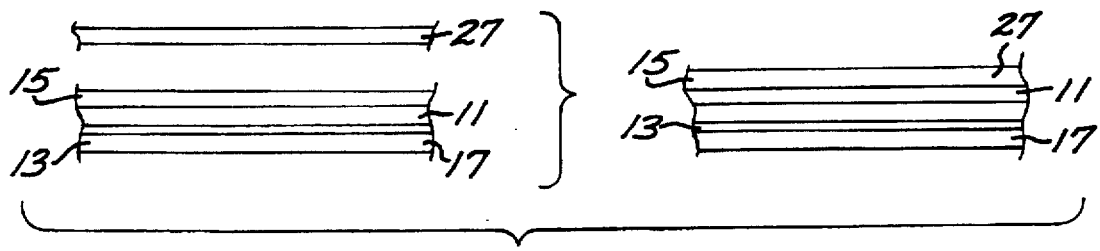

PHOTOPOLYMER HOLOGRAPHIC DECAL FOR PLASTIC SUBSTRATE

BACKGROUND OF THE INVENTION

The disclosed invention is directed generally to hologram structures, and more particularly to a hologram decal that is not subject to bubble formation when applied to a plastic substrate.

Hologram decals are useful in various applications such as identification cards and automobile center high mounted stoplights. Known hologram decal structures typically include a hologram layer, a protective polyester layer on one side of the hologram layer, and an adhesive layer on the side of the hologram layer. The hologram decal is secured to a mounting substrate by the adhesive layer.

A consideration with known hologram decals is the formation bubbles in a hologram decal which is mounted on a plastic substrate, when the plastic substrate and hologram decal are exposed to environmental heat. This results from the outgassing of volatile compounds from the plastic substrate which become trapped beneath the protective polyester layer. Outgassing the plastic substrate prior to application of a hologram decal temporarily fixes the problem on a short term basis, but further outgassing eventually occurs after some time.

SUMMARY OF THE INVENTION

It would therefore be an advantage to provide a hologram decal that is not subject to the formation of bubbles when mounted on a plastic substrate.

The foregoing and other advantages are provided by the invention in a hologram decal structure that includes a photopolymer hologram layer having hologram fringes recorded therein, a transparent pressure sensitive adhesive layer disposed on a first surface of the photopolymer hologram layer, and a transparent hardcoat layer disposed on a second surface of the photopolymer hologram layer.

The hologram decal structure is made by recording a hologram in a hologram layer having a first surface in contact with a first substrate and a second surface in contact with a second substrate; removing the first substrate from the hologram layer such that the first surface of the hologram layer is uncovered; attaching to the first surface of the hologram layer a laminar structure comprised of a pressure sensitive adhesive layer, and a release liner such that the pressure sensitive layer is against the first surface of the hologram layer; removing the second substrate from the hologram layer to uncover the second surface of the hologram layer; and applying a transparent coating to the second surface of the hologram layer

BRIEF DESCRIPTION OF THE DRAWINGS

The advantages and features of the disclosed invention will readily be appreciated by persons skilled in the art from the following detailed description when read in conjunction with the drawing wherein:

FIG. 1 is schematic sectional view illustrating the layers of a hologram decal in accordance with the invention.

FIGS. 2A, 2B, and 2C schematically illustrate a process for making the hologram decal of FIG. 1.

DETAILED DESCRIPTION OF THE DISCLOSURE

In the following detailed description and in the several figures of the drawing, like elements are identified with like reference numerals.

Referring now to FIG. 1, set forth therein is an unscaled schematic sectional view of a hologram decal laminate in accordance with the invention that is readily utilized as a center high mounted stoplight of a vehicle. The hologram decal laminate includes a photopolymer hologram layer 11 having hologram fringes recorded therein for producing a desired holographic image. A transparent pressure sensitive adhesive layer 13 is affixed to a first surface of the hologram layer 11, and a transparent abrasion resistant urethane hardcoat layer 15 is affixed to a second surface of the photopolymer hologram 11. The transparent pressure sensitive adhesive layer 13 and the transparent urethane hardcoat layer 15 comprise materials that are compatible with the particular material utilized for the hologram layer 11 and do not chemically attack the hologram layer 11. A release liner 17 protects the pressure sensitive adhesive layer 13 until the hologram decal laminate is to be applied to an appropriate smooth surface of an end use substrate, which can be polycarbonate or other plastic material. The hologram decal of FIG. 1 is applied by removing the release liner 17 and laminated onto the end use substrate.

Referring now to FIGS. 2A through 2C, the hologram decal of FIG. 1 can be made as follows. A conventional hologram recording film which is comprised of a hologram recording layer that is disposed between a thick Mylar substrate and a thin Mylar cover sheet is exposed and processed to produce a laminar structure that includes the hologram layer 11, a thick Mylar substrate 19 disposed on the first surface of the hologram layer 11, and a thin Mylar cover sheet 21 disposed on the second surface of the hologram layer, as shown in FIG. 2A. The pressure sensitive adhesive layer 13 and the release liner 17 are commercially available in the form of a transfer adhesive structure that includes the pressure sensitive adhesive layer 13, a thin release sheet 23 disposed on one side of the pressure sensitive adhesive layer 13, and a thick release sheet 17 disposed on the other side of the pressure sensitive adhesive layer 13. The thin Mylar cover sheet 21 is removed from the hologram layer 11, and the thin release sheet 23 is removed from the pressure sensitive layer 13. The pressure sensitive adhesive layer 13 is then roll laminated onto the hologram layer 11 to produce a laminar structure that includes the thick Mylar substrate 19, the hologram layer 11, the pressure sensitive layer 13, and the thick release sheet 17, as further shown in FIG. 2A.

Referring now to FIG. 2B, the thick Mylar substrate 19 is removed, and an appropriate urethane solution is coated onto the hologram layer 11. The urethane solution coating is cured to produce a laminar structure wherein the transparent abrasion resistant urethane hardcoat layer 15 is affixed to the hologram layer 11, as further shown in FIG. FIG. 2B. By way of illustrative example, the urethane solution applied to the hologram layer comprises an air dry, water-borne urethane solution that is suitable for exterior coating purposes.

Referring now to FIG. 2C, a low tack tape 27 is applied over the hardcoat layer 15 promptly after curing to serve as a protective layer as well as a carrier for the decal. In use, the decal with the low tack tape 27 can be laminated onto an end use substrate by use of a laminating machine. The thick release layer 17 is appropriately removed prior to lamination onto the end use substrate, and the low tack tape 27 is removed after lamination.

The foregoing has thus been a disclosure of a hologram decal structure that advantageously avoids the formation of outgassing bubbles when applied to a plastic substrate.

Although the foregoing has been a description and illustration of specific embodiments of the invention, various modifications and changes thereto can be made by persons skilled in the art without departing from the scope and spirit of the invention as defined by the following claims.

What is claimed is:

1. A hologram decal comprising:
    a photopolymer hologram layer having hologram fringes recorded therein, said photopolymer hologram having first and second surfaces;
    a transparent pressure sensitive adhesive layer disposed on the first surface of said photopolymer hologram layer; and
    a transparent hardcoat disposed on the second surface of said photopolymer hologram layer.

2. The hologram decal of claim 1 wherein said transparent hardcoat comprises urethane.

3. The hologram decal of claim 1 further including a release liner covering said transparent pressure sensitive adhesive layer.

4. A process for making a hologram decal comprising the steps of:
    recording a hologram in a hologram layer having a first surface and a second surface;
    attaching to the first surface of the hologram layer a laminar structure comprised of a pressure sensitive adhesive layer, and a release liner such that the pressure sensitive layer is against the first surface of the hologram layer; and
    applying a transparent coating to the second surface of the hologram layer.

* * * * *